United States Patent
Friedlaender

(10) Patent No.: US 9,358,552 B2
(45) Date of Patent: Jun. 7, 2016

(54) DEVICE AND METHOD FOR SORTING OUT FINE PARTICLES FROM A PARTICLE MIXTURE

(75) Inventor: Thomas Friedlaender, Regensburg (DE)

(73) Assignee: KRONES AG, Neutraubling (DE)

( * ) Notice: Subject to any disclaimer, the term of this patent is extended or adjusted under 35 U.S.C. 154(b) by 498 days.

(21) Appl. No.: 13/096,129

(22) Filed: Apr. 28, 2011

(65) Prior Publication Data

US 2011/0272329 A1 Nov. 10, 2011

(30) Foreign Application Priority Data

May 4, 2010 (DE) .......................... 10 2010 028 555

(51) Int. Cl.
*B03C 7/00* (2006.01)
*B03C 7/04* (2006.01)
*B29B 17/02* (2006.01)
*B29K 27/06* (2006.01)
*B29K 67/00* (2006.01)

(52) U.S. Cl.
CPC . *B03C 7/04* (2013.01); *B29B 17/02* (2013.01); *B29B 2017/0203* (2013.01); *B29B 2017/0265* (2013.01); *B29K 2027/06* (2013.01); *B29K 2067/003* (2013.01); *Y02W 30/527* (2015.05); *Y02W 30/622* (2015.05)

(58) Field of Classification Search
CPC .............. B03C 7/00; B03C 7/02; B03C 7/04; B03C 9/00; B03C 2201/20; B29B 17/02; B29B 2017/0203; B29B 2017/0265
USPC ................................ 209/127.1–130, 213, 218
See application file for complete search history.

(56) References Cited

U.S. PATENT DOCUMENTS

| | | | |
|---|---|---|---|
| 2,786,635 A * | 3/1957 | Oishi ...................... | B29B 17/02 209/127.4 |
| 2,848,108 A * | 8/1958 | Brastad ..................... | B03C 7/04 209/127.3 |
| 2,873,048 A | 2/1959 | Gear | |
| 3,402,814 A | 9/1968 | Morel et al. | |
| 4,738,772 A | 4/1988 | Giesfeldt | |
| 5,000,203 A | 3/1991 | Hamada | |
| 5,735,402 A * | 4/1998 | Pezzoli et al. ................ | 209/129 |

(Continued)

FOREIGN PATENT DOCUMENTS

| CH | 64703 A | 4/1914 |
|---|---|---|
| DE | 4042 | 1/1954 |

(Continued)

OTHER PUBLICATIONS

Extended European Search Report for EP11159412.3 mailed Aug. 11, 2011.

(Continued)

*Primary Examiner* — Joseph C Rodriguez
*Assistant Examiner* — Kalyanavenkateshware Kumar
(74) *Attorney, Agent, or Firm* — Marshall, Gerstein & Borun LLP

(57) ABSTRACT

A method for sorting out fine particles from a particle mixture arranged on a surface of a support element wherein the particle mixture comprises particles of different sizes, in particular fine particles with a diameter of up to 1 mm, where the fine particles are at least partially sorted out from the particle mixture by means of an electrostatically charged separating element.

10 Claims, 2 Drawing Sheets

(56) References Cited

U.S. PATENT DOCUMENTS

| | | |
|---|---|---|
| 6,903,294 B1 * | 6/2005 | Daiku et al. ............... 209/127.3 |
| 7,318,528 B1 * | 1/2008 | Hessabi ......................... 209/215 |
| 2003/0132140 A1 * | 7/2003 | Oder et al. .................... 209/218 |
| 2003/0192813 A1 * | 10/2003 | Yan et al. .................... 209/127.1 |
| 2005/0061713 A1 * | 3/2005 | Gates ........................... 209/128 |
| 2006/0081507 A1 * | 4/2006 | Gates ........................ 209/127.1 |
| 2007/0084757 A1 * | 4/2007 | Jeon et al. .................. 209/127.1 |

FOREIGN PATENT DOCUMENTS

| | | |
|---|---|---|
| DE | 1758682 A1 | 4/1971 |
| GB | 11852 | 0/1913 |
| GB | 1107574 A | 3/1968 |

OTHER PUBLICATIONS

Search Report for German Application No. 10 2010 028 555.2 dated Jan. 14, 2011.

* cited by examiner

200
DEVICE AND METHOD FOR SORTING OUT FINE PARTICLES FROM A PARTICLE MIXTURE

CROSS-REFERENCE TO RELATED APPLICATION

The present application claims the benefit of priority of German Patent Application No. 10201002855.2 filed May 4, 2010. The entire text or the priority application is incorporated herein by reference in its entirety.

Field of the disclosure The present disclosure relates to a device and a method for sorting out fine particles from a particle mixture arranged on a surface of a support element.

BACKGROUND

Recycled PET plastic bottles are frequently used in the drink industry for producing new plastic bottles. For this purpose, the recycled old bottles are first shredded and then foreign particles, for example, particles of foreign plastics such as PVC, are sorted out from the ground material flow gained in this way. The PET particles or PET flakes obtained in this way are then used to manufacture new PET bottles.

During the sorting out process, large foreign substance particles can be separated out by means of an optical sorter or NIR sorter (near-infrared sorter). The ground material flow normally also comprises small foreign particles, however, which are not detected by the optical or NIR sorter. These fine particles can crystallize out during the further processing and so cloud the plastic bottles manufactured from the recycled material.

SUMMARY OF THE DISCLOSURE

Therefore an aspect of the present disclosure is to provide a device and method which allow improved sorting out of the fine particles from a ground material flow.

The method according to the disclosure for sorting out fine particles from a particle mixture arranged on a surface of a support element, whereby the particle mixture comprises particles of different sizes, in particular fine particles with a diameter of up to 1.00 mm, is provided in that the fine particles are at least partially sorted out from the particle mixture by means of an electrostatically charged separating element.

Due to the fact that the fine particles are normally particularly strongly electrostatically charged due to friction, they can be sorted out from the particle mixture by means of the electrostatically charged separating element in a simple manner.

The particle mixture can particularly correspond to a ground material flow. The particle mixture can comprise different plastics, for example, PET (polyethylene terephthalate) or PVC (polyvinyl chloride). The particle mixture can comprise particles of different sizes, in particular particles with a maximum diameter of up to 3.0 cm.

Referred to as line particles here are particle mixture particles that have a maximum particle diameter of up to 1.00 mm, in particular up to 0.50 mm.

The separating element, in particular a surface of the separating element, can be given an electrostatic charge, meaning it can be brought to a predetermined electrical voltage or placed under a predetermined electrical voltage.

In this process, the charge of the separating element can be selected such that an attractive force acts on the fine particles of the particle mixture. In other words, the separating element can consequently have a charge that is the opposite the charge of the fine particles.

The fine particles can have an electrostatic charge due to the friction among one another and/or with other particles of the particle mixture. Particles made of a certain material frequently display a predetermined charge.

In particular, two electrostatically charged separating elements can be provided, whereby the two separating elements have two different electrostatic charges, in particular opposite charges. In this way, both positively and negatively electrostatically charged fine particles can be sorted out or culled out from the particle mixture.

The separating element can be formed in such a way that the fine particles sorted out from the particle mixture can settle on a surface of the separating element due to an electrostatic attractive force.

The distance between the separating element and the particle mixture and/or the electrostatic charge of the separating element can be selected or adjusted in such a manner that fine particles can be at least partially sorted out from the particle mixture. In other words, the distance between the separating element and the particle mixture and/or the electrostatic charge of the separating element can be selected in such a way that electrostatically charged fine particles of the particle mixture are accelerated in the direction of the separating element.

The separating element can be located next to and/or above the particle mixture. In particular, the method can comprise an arrangement of the separating element next to and/or above the particle mixture.

The particle mixture can be moved relative to the separating element, in particular along a direction parallel to the surface of the support element on which the particle mixture is arranged. In other words, the particle mixture can be directed below and/or next to the separating element. For example, the support element can be a conveyor medium, for example, a conveyor belt. In this way, the fine particles can be sorted out from the ground material flow directly.

Alternatively or additionally, the separating element can also be moved. For example, the separating element can be moved along above the surface of the support element on which the particle mixture is arranged, and in the process sort out the fine particles.

Alternatively, or additionally, the support element can be moved in such a way that the particle mixture separates at least partially from the surface of the support element. By means of such a loosening and/or whirling up, the charged fine particles can be more easily moved by the electric force action to the separating element and settled on this.

The movement of the support element can particularly comprise shaking, teetering and/or oscillating of the support element. For example, the support element can vibrate, particularly at a predetermined frequency.

The separating element can be electrostatically charged by means of a charging device. In particular, the separating element can be held at a predetermined potential by means of the charging device. The charging device can, for example, be a ribbon generator or Van-de-Graaff generator.

Fine particles that stick to the separating element can be removed from the separating element. In particular, the fine particles can be removed away from the particle mixture. This makes it possible to permanently free the particle mixture of the fine particles.

In particular, the separating element can comprise a film or a film roll. In the case of a film roll, the film can be moved on the film roll and be freed of the fine particles away from the particle mixture.

The disclosure furthermore provides a device for sorting out fine particles from a particle mixture that comprises particles of different sizes, in particular fine particles with a diameter of up to 1.00 mm, wherein the device comprises a support element for arranging the particle mixture on a surface of the support element and an electrostatically charged separating element that is formed and/or arranged in such a way that the fine particles can be at least partially sorted out from the particle mixture by means of the electrostatically charged separating element.

An above-described method for sorting out fine particles can be carried out with a device of this kind. In particular, the particle mixture, the support element and/or the separating element can display one or more of the above-described characteristics.

The separating element can be arranged at least partially above and/or next to the surface of the support element for arranging the particle mixture.

In particular, the support element can be movable in such a way that a particle mixture arranged on the surface of the support element separates at least partially from the surface due to the movement. For this purpose, the device can comprise, for example, a shaking element and/or a teetering element.

The support element and the separating element can be movable relative to each other. In particular, the support element can comprise a conveyor medium, for example, a conveyor belt.

The device can furthermore comprise a charging device for electrostatically charging the separating element. The charging device can, for example, be a ribbon generator or Van-de-Graaff generator.

The separating element can comprise a film, in particular a film roll.

The device can furthermore comprise a cleaning element, for example, a brush, for removing fine particles arranged on the separating element.

An above-described device can in particular be a part of a recycling system, in particular a system for PET recycling.

BRIEF DESCRIPTION OF THE DRAWINGS

Further characteristics and advantages of the disclosure are explained in the following on the basis of explanatory figures. Shown are.

DETAILED DESCRIPTION OF THE PREFERRED EMBODIMENT

Figure 1:
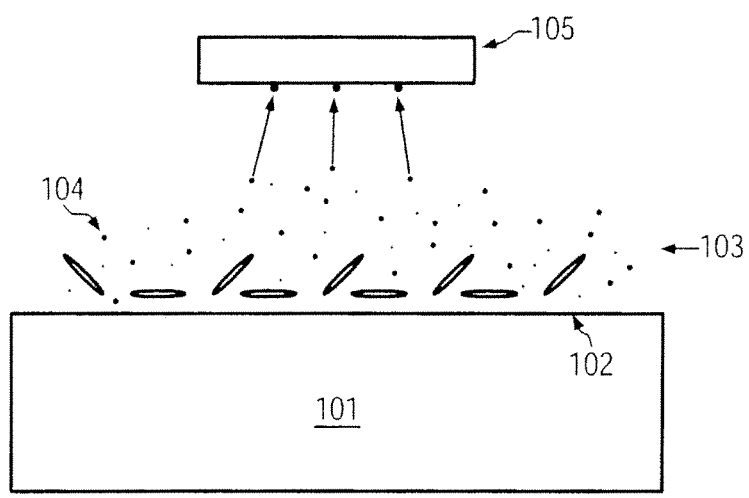
FIG. 1 A side-view of an exemplary device for sorting out fine particles from a particle mixture.

FIG. 1 shows an exemplary support element 101, whereby a particle mixture 103 is arranged on a surface 102 of the support element 101.

The particle mixture comprises particles of different sizes, in particular particles with a maximum diameter of up to 3.0 cm. Particles with a maximum diameter of up to 1.00 mm are designated here as fine particles.

The particle mixture 103 comprises particles of PET as well as fine particles 104 of foreign plastics, such as PVC.

The fine particles 104 normally display a strong electrostatic charge caused by friction. The friction here can be friction resulting within the particle mixture and/or friction resulting from treatment equipment for processing and/or transporting the particle mixture.

For this reason, the fine particles 104 can be at least partially sorted out from the particle mixture 103 by means of an electrostatically charged separating element 105. In particular, the separating element 105 can be formed and/or arranged in such a way that fine particles 104 are accelerated by an electric force action toward the separating element 105 and settle on a surface of the separating element 105. The separating element 105 can thereupon be slowly moved farther and freed of the fine particles 104 away from the particle mixture 103.

Figure 2:
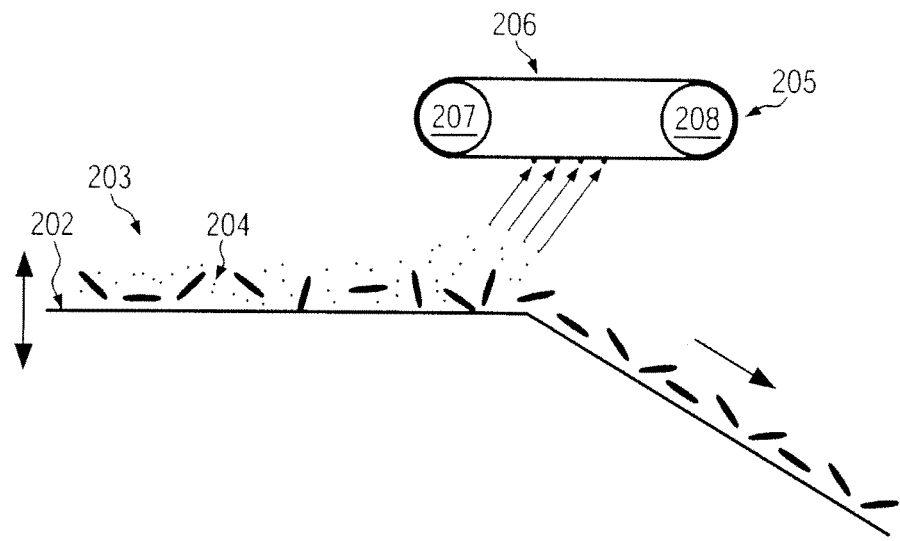
FIG. 2 A side-view of a further exemplary device for sorting out fine particles from a particle mixture.

FIG. 2 shows a further exemplary device for sorting out fine particles 204 from a particle mixture 203 arranged on a surface 202 of a support element. In this case, the support element corresponds to a conveyor element, for example, a conveyor belt or a vibration conveyor trough. The particle mixture 203 is moved by this conveyor element under and past a separating element 205.

The conveyor element is furthermore deflected perpendicularly to the surface 202, as indicated by the double-sided arrow in FIG. 2. As a result of this vibration of the support element, the particle mixture 203 is swirled up, meaning at least partially separated from the surface 202. Due to the lower mass of the fine particles 204, these are more strongly swirled up, meaning they are more strongly separated from the surface 202. In particular, this increases the average distance of the fine particles 204 from the surface 202 and from neighboring particles of the particle mixture 203. In this way, the fine particles 204 can be more easily arranged on the separating element 205.

Due to the attractive electric force, which acts on the electrostatically charged fine particles 204 by means of the electrostatically charged separating element 205, these particles are moved on to a surface of the separating element 205 and settled there. The movement of the fine particles 204 is illustrated by several exemplary arrows in FIG. 2.

In FIG. 2, the separating element 205 is a film roll. This comprises an electrostatically charged, meaning placed under an electric voltage, film 206, which can be moved over deflection rollers 207 or 208.

The exemplary particle mixture in FIG. 2 corresponds to a ground material flow of a PET recycling system. The ground material flow largely freed of fine particles 204 is transported away on a tilted plane in FIG. 2 and is available for further processing. The fine particles 204 arranged on the film 206 can be removed from the film 206 and thereupon disposed of.

Figure 3:
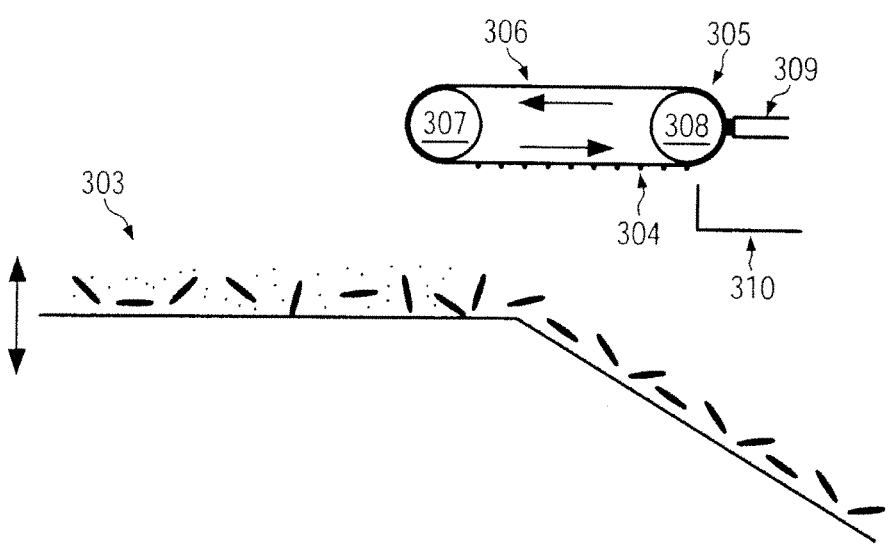
FIG. 3 A side-view of a further exemplary device for sorting out fine particles from a particle mixture.

FIG. 3 shows an exemplary device for sorting out fine particles from a particle mixture 303 arranged on a surface of a support element. The device substantially corresponds to the device shown in FIG. 2. The device in FIG. 3 furthermore comprises a cleaning element 309, for example, a brush.

The film 306 of the separating element 305 can be moved by the deflection rollers 307 or 308. In this example, a counter-clockwise movement is indicated by two arrows. The film 306 can consequently be slowly moved farther and freed of the fine particles 304 by the cleaning element 309. The fine particles 304 removed from the film 306 can be caught in a collecting element 310 and fed to a means of disposal. The film 306 freed of tine particles 304 is moved farther after the cleaning element 309, until it is arranged at least partially above the particle mixture 303 and can attract and settle new fine particles 304.

The exemplary device can furthermore comprise a charging device, for example, a ribbon generator, which electrostatically charges the film 306 of the separating element 305, meaning the generator places the separating element under a voltage.

In this example, the particle mixture 303 is moved on a conveyor element relative to the separating element 305. Alternatively, or additionally, the separating element 305 can also be moved.

The abovementioned exemplary devices can be part of a recycling system for PET bottles. Such a system can furthermore comprise optical sorters and/or NIR (near-infrared) sorters for sorting out large foreign substance particles.

The above-described devices can also display a plurality of separating elements, in particular, two separating elements. The two separating elements can, in particular, display opposite charges. In this way, fine particles with different charges can be sorted out from the particle mixture.

The two separating elements can be fully or partially arranged next to each other and/or behind each other.

It is understood that characteristics mentioned in the previously described embodiments are not restricted to these special combinations and are also possible in any other combinations.

The invention claimed is:

1. A method for sorting out fine particles from a particle mixture arranged on a surface of a support element, wherein the particle mixture comprises particles of different sizes, in particular, fine particles with a diameter of up to 1 mm, and wherein the particle mixture corresponds to a ground material flow of a plastic recycling system, the method comprising:
   locating an electrostatically charged separating element one or more of next to or above the particle mixture;
   moving the support element in such a way that the particle mixture separates at least partially from the surface of the support element in an area located at least partially below the separating element;
   at least partially sorting out the fine particles from the particle mixture by means of the electrostatically charged separating element; and
   removing fine plastic particles adhering to the separating element from the separating element via a cleaning element.

2. The method according to claim 1, wherein the movement of the support element comprises one or more of a shaking, teetering or oscillating of the support element.

3. The method according to claim 1, and moving the particle mixture relative to the separating element.

4. The method according to claim 3, wherein moving the particle mixture relative to the separating element is along a direction parallel to the surface of the support element on which the particle mixture is arranged.

5. The method according to claim 1, and wherein the separating element is electrostatically charged by means of a charging device.

6. The method according to claim 1, wherein moving the support element in such a way that the particle mixture separates at least partially from the surface of the support element in an area located at least partially below the separating element comprises moving the support element perpendicular to the surface of the support element such that the particle mixture separates at least partially from the surface of the support element in an area located at least partially below the separating element.

7. A device for sorting out fine particles from a particle mixture that comprises particles of different sizes, in particular, fine particles with a diameter of up to 1 mm, comprising:
   a support element for arranging the particle mixture on a surface of the support element, the support element is movable in such a way that the particle mixture arranged on the surface of the support element separates at least partially from the surface due to the movement, in an area located at least partially below the separating element;
   an electrostatically charged separating element that is one or more of formed or arranged in such a way that the fine particles can be at least partially sorted out from the particle mixture by means of the electrostatically charged separating element, wherein the separating element is arranged at least partially above and/or next to the surface of the support element for arranging the particle mixture; and
   a cleaning element for removing fine plastic particles arranged on the separating element;
   wherein the device is part of a recycling system for plastic, and wherein the particle mixture corresponds to a ground material flow of the plastic recycling system, and
   wherein the support element is movable perpendicular to the surface of the support element such that the particle mixture arranged on the surface of the support element separates at least partially from the surface due to the movement, in an area located at least partially below the separating element.

8. The device according to claim 7, wherein the support element and the separating element can be moved relative to each other.

9. The device according claim 7, and a charging device for electrostatically charging the separating element.

10. The device according to claim 7, wherein the separating element comprises a film.

* * * * *